United States Patent
Choyi et al.

(10) Patent No.: US 8,191,106 B2
(45) Date of Patent: May 29, 2012

(54) SYSTEM AND METHOD OF NETWORK ACCESS SECURITY POLICY MANAGEMENT FOR MULTIMODAL DEVICE

(75) Inventors: Vinod Kumar Choyi, Ottawa (CA); Dmitri Vinokurov, Ottawa (CA)

(73) Assignee: Alcatel Lucent, Paris (FR)

( * ) Notice: Subject to any disclaimer, the term of this patent is extended or adjusted under 35 U.S.C. 154(b) by 1270 days.

(21) Appl. No.: 11/808,236

(22) Filed: Jun. 7, 2007

(65) Prior Publication Data
US 2008/0307487 A1  Dec. 11, 2008

(51) Int. Cl.
  G06F 17/00 (2006.01)
  H04L 29/06 (2006.01)
(52) U.S. Cl. .......................................... 726/1; 713/150
(58) Field of Classification Search ....... 726/1; 713/150
  See application file for complete search history.

(56) References Cited

U.S. PATENT DOCUMENTS

| | | | |
|---|---|---|---|
| 2003/0157938 A1* | 8/2003 | Haase et al. | 455/445 |
| 2003/0224758 A1* | 12/2003 | O'Neill et al. | 455/411 |
| 2003/0229900 A1* | 12/2003 | Reisman | 725/87 |
| 2004/0087304 A1* | 5/2004 | Buddhikot et al. | 455/426.2 |
| 2004/0090937 A1* | 5/2004 | Chaskar et al. | 370/331 |
| 2004/0137902 A1* | 7/2004 | Chaskar et al. | 455/436 |
| 2005/0102529 A1* | 5/2005 | Buddhikot et al. | 713/200 |
| 2006/0072542 A1* | 4/2006 | Sinnreich et al. | 370/351 |
| 2007/0022289 A1* | 1/2007 | Alt et al. | 713/168 |
| 2007/0026866 A1* | 2/2007 | Krishnamurthi et al. | 455/440 |
| 2007/0291786 A1* | 12/2007 | Maes | 370/465 |
| 2008/0080479 A1* | 4/2008 | Maes | 370/352 |
| 2009/0144798 A1* | 6/2009 | Ozog | 726/1 |

* cited by examiner

Primary Examiner — Techane Gergiso
(74) Attorney, Agent, or Firm — Marks & Clerk

(57) ABSTRACT

A system and method are provided for management of access security for access by a multimodal device to a converged fixed/mobile network. An inter-technology change-off monitoring entity (ICME) is provided to monitor an inter-technology change-off of the multimodal device and to notify a policy manager of the inter-technology change-off. The policy manager looks up in a policy database, security policies applicable to the user of the multimodal device and the particular technology being used by the multimodal device. The policy manager conveys to various policy enforcement points throughout the converged fixed/mobile network the applicable security policies which take into account the user's identity and the access technology being used.

18 Claims, 5 Drawing Sheets

SYSTEM AND METHOD OF NETWORK ACCESS SECURITY POLICY MANAGEMENT FOR MULTIMODAL DEVICE

FIELD OF THE INVENTION

The invention relates to network access security, intrusion prevention and more particularly to policy for network access security and perimeter control.

BACKGROUND OF THE INVENTION

Service providers who provide network access to users typically implement access security for the network by putting in place and managing network access policies. Access security, when configured properly helps to protect both the user devices and the network itself from malicious attacks and abuses.

Various approaches have been taken to implement access security. One is to set common filtering rules for the entire enterprise or operator network. These rules or policies may be specific for the type of traffic, the specific services to be provided, or the user location, but does not take into account the identity of the users in the protected network nor the fact that the type of access technology being used for access can change as in the case of a multimodal device which may use any one of a number of access technologies. Many current application-aware firewalls and IDS/IPS (intrusion detection system/intrusion prevention system) systems have been developed according to this approach. In some multimodal networks, separate access networks or specific access technologies have unique corresponding IP subnets assigned to them. For these networks the application-aware firewalls are configured to have a specific security policy per subnet of IP addresses.

A more recent approach to managing security is to set security policy depending upon the identity of the user and/or the user's duties. In a network often there are different roles, functions or privileges assigned to each user. Consequently, it is possible to implement access security such that when a user accesses the network, the user is identified and authenticated and then the policies associated with the assigned role, function or privileges assigned to the user are used to provide control over the user's access to resources. An example of this type of approach is the use of ACLs (access control lists), for role-based or user-based access controls. An authorized device may be utilized by any one of a number of various users for network access. Each user is subject to the network security policy determined by his or her identity. FIG. 1A illustrates this principle. Network access device 10 may be used to access a network 5 by a first user 20, second user 22, or third user 24, each of which have different identities, and may have different roles or privileges. The access device 10 accesses the network 5 through a security policy enforcement point (SPEP) 21 which typically is a security proxy which controls access and traffic in both directions. FIG. 1B illustrates a single user 20 accessing the network 5 using any one of a number of different access devices 10, 12, and 14 coupled to the network 5 through the SPEP 21. No matter which device 10, 12, 14 the user utilizes to access the network 5, since a single user 20 always maintains the same identity, the same role and the same privileges, the same security policies will be applied. Independent of these security policies, tools such as port-based access control 802.1x or IMEI (international mobile equipment identity) are used for the purposes of identification and/or authentication of the devices when used to access the network.

Known networks are generally built based on an assumed fixed access technology being used. The resulting security mechanisms to secure the network (for example, filtering rules, access control, intrusion detection criteria, traffic management) therefore are tailored to the characteristics of the assumed fixed access technology being used.

With the advent of IMS and the effort towards convergence between fixed and mobile networks, the networks of the future will be drastically different. Independent "Mobile Core" and "Fixed Core" networks will be replaced with what is referred to as a converged network which has a common core connecting to different access technologies. Future implementations of "3GPP Access" or "CDMA2000 Access" will not automatically require a WCDMA access technology as is currently the case. The future 4G Access networks or the All-IP access of an operator would comprise of UMTS UTRAN, 802.11 Access Network, 802.16 Access Serving Network (ASN) or other networks based on different radio access technology. The 4G access network would also comprise of fixed access like Ethernet and DSL. Currently there exist multimodal devices (laptops, PDAs) that support multiple access technologies like Ethernet, WLAN, Bluetooth etc. on the same device. Mobile and smart phones now have the capability to work in both UTRAN/1x-EV-DO and WLAN environments and PCMCIA cards for UMTS and CDMA2000 are also available which can be used on mobile devices to support seamless mobility between UMTS/CDMA2000 and WLAN and vice versa.

FIG. 2A depicts security elements of an example converged fixed/mobile network 100. The security system of the converged network 100 typically will have a standard authentication, authorization, and accounting (AAA) 110 database which may operate in tandem with a public key infrastructure (PKI) 115, which in turn operates with IP security (IPSec) 130, and application transport layer data/signaling security 120. Monitoring activity into and from the converged network 100 are a firewall/network address translator (NAT) 140, and an IDS/IPS 145. External to the converged network 100 are devices which may use any number of access technologies including but not limited to fixed access technologies such as Ethernet/DSL 150, and wireless access technologies such as UTRAN/1xEV-DO 160, 802.11 access 170, and 802.16 access 180.

These fixed/mobile converged networks support multimodal devices having multiple wireless and fixed network interfaces, such as UMTS, WLAN, WiMax, CDMA2000, and Ethernet, each having their own unique access security requirements. Contrary to the traditional assumption of a single fixed access technology used by known security policy enforcement of network access, today's multimodal devices can use any one of a number of different types of access technologies to connect to the access network which could have uniquely different protocols, standards, and hence unique potential vulnerabilities to specific exploits and attacks. The different access technologies could have very different physical layer characteristic requirements such as bandwidth, delay, packet loss, and handoff parameters, and could have very different requirements for access to network connections, authentication, encryption, and integrity of data. The normal performance capabilities and capacities may also be quite different from one another. This dictates that security requirements, criteria, and mechanisms in UMTS, WLAN, WiMax, fixed networks, etc. are all different. The natural background traffic, capabilities, and traffic characteristics (bandwidth, delay, error-rates, etc.) also vary for different technologies.

In a multimodal converged network, security mechanisms which are to be effective cannot make the assumption that a single access technology will be used because no single fixed set of mechanisms specific to a single access technology will be sufficient to provide security to the multimodal converged network.

FIG. 2B illustrates a known situation where a user 20 has a multimodal mobile device 42 which may communicate using one of two access technologies 32, 34 which typically need to be handled by a SPEP 51 before access to the network 35 is given. In order for the multimodal device 42 to have access to the network 35 in a secure fashion, the SPEP 51 must be able to handle security for either kind of access technology. A fixed/mobile converged network which provides support for multimodal device mobility ideally would provide for end-user access to the network using any access technology of the multimodal device and ideally would be capable of dynamically providing security to a user's access when the user changes the access technology of the multimodal device while maintaining the same user identity registered on the security policy enforcement point.

Known approaches to access security management do not address the situation when the end-user dynamically changes the access technology used by his or her multimodal device within the same premises under the same identity; for instance when the end-user switches between UMTS and WLAN as a subscriber within the rich presence concept framework. Such a dynamic change in access technology will be referred to as an inter-technology change-off, which typically occurs when a user's device changes from accessing one base station using one access technology to accessing another base station using a different access technology. Such change-offs may or may not be smooth. Known systems which do not track these access technology changes remain unaware of them from a security policy perspective. Generic rules and policies or those based on the user's identity and his credentials of known systems do not provide an appropriate level of security according to the distinctive characteristics of the various different access technologies of the multimodal device. For example, firewall/filtering or IDS/IPS rules even when being specific per user's identity (and corresponding credentials) do not take into account the different possible access technologies the end-device could use; instead they are based on the assumption that the devices use a fixed access technology of the same kind typical for the given network segment (for example desktop computers using Ethernet). As a result, an event, traffic or an end-user's action which is harmless in the conditions when the first access technology is used, can potentially be destructive for the device or for the service when the second access technology is used, if not prevented by the security controls in the network.

Conversely, a relatively harmless switching from one type of access technology to another type of access technology could raise unnecessary alarms if a security policy ideal for the access technology used before the switch is applied after the switch. One example of this is the behavior of an Intrusion Detection/Prevention System (IDS/IPS) upon a switch from UMTS to WLAN. A mobile device having both UMTS and WLAN interfaces connected to UMTS access can at most use a maximum bandwidth of 2 Mbs. Once the mobile device successfully performs a change-off to a WLAN network it is able to achieve a bandwidth of around 20 Mbs or higher. A sudden increase in bandwidth usage by the mobile device/subscriber from 2 Mbs to 20 Mbs would in general be detected by the IDS/IPS as anomalous behavior, and the IDS/IPS would quarantine the user even though the behavior was not malicious. If the mobile device performs a subsequent change-off from WLAN to UMTS or other radio access, the IDS/IPS would again be triggered. In general both IPS's and firewalls need to have different values for the same security settings/parameters/thresholds of the requested access depending upon the access technology used. For example, for wireless network access the threshold number of packets for setting off a "malicious scan indication" is generally lower than the same thresholds for fixed network access. In a fixed network, a high number of packets, which in a wireless network would usually be an indication of a malicious attack such as a flooding attack, are nothing more than rather neutral conditions in the fixed network.

Known solutions do not scale well for operator or enterprise networks having a converged fixed/mobile core and having an access network consisting of multiple access technologies (like UTRAN/1x-EV-DO, WLAN, WiMax, DSL, Ethernet etc.). Since known solutions are based on the use of a single-access technology they cannot offer dynamic change in security mechanisms, particularly a dynamic change in security appropriate to a dynamically changing access technology. Another problem with known solutions is that they are based on the assumption that after a mobile device/subscriber is authenticated the IP address allocated to the device remains constant until the device disconnects/disassociates from the network. Typically, the security mechanisms of known solutions are applied to the device based on its IP address or subscriber identity. This however is not effective in the case of mobile IP in which a mobile device roams between subnets (as well as between different technologies), the acquired IP address changes (Care-of-Address). An effective multimodal security mechanism should take into consideration that the IP address of the device may change. Moreover, since known solutions are agnostic to the access technology being used, there has not been any need from a security perspective to monitor IP addresses or L2 and L3 messages.

With respect to known attempts to solve the problem using assigned IP address subnets, FIG. 3 depicts a situation for which different access technologies cannot be recognized just by the IP address subnets assigned to each access technology domain. In FIG. 3, a common and modified RNC (mRNC) 205 controls both the NodeBs (for example UTRAN-NodeB 230) as well as the WiMax-BSs (for example WiMax BS 220). As can be seen in the Figure, the addresses assigned to devices in both the UTRAN and WiMax belong to the GGSN's (Gateway GPRS Support Node) 240 subnet regardless of whether the multimodal device 200 utilizes WiMax or UTRAN. For completeness an HSS/HLR (Home Subscriber Server/Home Location Register) 250, the SGSN 210 (Serving GPRS Support Node) and the public internet 290 are depicted.

Converged fixed/mobile networks would benefit from a novel system and method to manage security in such a way that can accommodate multiple access technologies.

SUMMARY OF THE INVENTION

According to one broad aspect the invention provides for a system for network access security policy management of multimodal access to a converged network, the system comprising: an inter-technology change-off monitoring entity (ICME) for detecting an inter-technology change-off of a multimodal device from a first access technology to a second access technology, and for transmitting an inter-technology change-off message; a policy database for storing a plurality of access technology policies; and a policy manager for receiving said inter-technology change-off message from the ICME, for searching said policy database for an access technology policy corresponding to said second access technology, for determining appropriate policies to be enforced, and for distributing said appropriate policies to at least one policy enforcement point (PEF) for enforcing said appropriate policies in respect of access by the multimodal device to the converged network.

In some embodiments of the invention, said inter-technology change-off message comprises a user ID identifying a subscriber, and at least one of a device ID, a second access technology indicator, and a first access technology indicator.

In some embodiments of the invention, said policy manager is further for looking up, in a subscriber database, subscriber security parameters of a subscriber identified in the inter-technology change-off message, and for searching said policy database for a user policy corresponding to said subscriber.

In some embodiments of the invention, said policy manager distributes said appropriate policies after a layer 2 portion of said inter-technology change-off has completed and before a layer 3 portion of said inter-technology change-off has completed.

In some embodiments of the invention, the ICME is one of a layer 2 monitoring entity and a higher than layer 2 monitoring entity.

In some embodiments of the invention, the ICME is a layer 2 monitoring entity and wherein the inter-technology change-off is between UMTS and WLAN and wherein a change-off is detected when an association occurs.

In some embodiments of the invention, the ICME is a layer 3 monitoring entity and wherein the inter-technology change-off is between UMTS and WLAN and wherein the change-off is detected on an occurrence of a change in an IP address allocated to the multimodal device, receipt of a message from the multimodal mobile device, receipt of a DHCP message, or any other mechanism from the network or device to initiate a layer 3 handoff or change-off.

In some embodiments of the invention, said appropriate policy is a combination of said user policy and said access technology policy, and wherein portions of said appropriate policy are distributed to each PEF of said at least one PEF.

In some embodiments of the invention, said combination of said user policy and said access technology policy is a sum of said user policy plus said access technology policy.

According to another broad aspect the invention provides for a method for network access security policy management of multimodal access to a converged network, the method comprising: detecting at an inter-technology change-off monitoring entity (ICME) occurrence of an inter-technology change-off of a multimodal device from a first access technology to a second access technology; transmitting an inter-technology change-off message from said inter-technology change-off monitoring entity (ICME) to a policy manager; searching a policy database by said policy manager for an access technology policy corresponding to said second access technology; determining at the policy manager appropriate policies to be enforced; distributing from said policy manager to at least one policy enforcement point (PEF) said appropriate policies; and enforcing said appropriate policies at said at least one PEF in respect of access by the multimodal device to the converged network.

Some embodiments of the invention further provide for looking up, in a subscriber database, by the policy manager, subscriber security parameters of a subscriber identified in the inter-technology change-off message; and searching said policy database, by said policy manager, for a user policy corresponding to said subscriber.

In some embodiments of the invention, said step of distributing said appropriate policies is performed after a layer 2 portion of said inter-technology change-off has completed and before a layer 3 portion of said inter-technology change-off has completed.

In some embodiments of the invention, the step of detecting occurrence of an inter-technology change-off occurs at one of a layer 2 monitoring level and a higher than layer 2 monitoring level.

In some embodiments of the invention, detecting occurrence of an inter-technology change-off occurs at a layer 2 monitoring level, wherein the inter-technology change-off is between UMTS and WLAN, and wherein the inter-technology change-off is detected when an association occurs.

In some embodiments of the invention, detecting occurrence of an inter-technology change-off occurs at a layer 3 monitoring level, wherein the inter-technology change-off is between UMTS and WLAN, and wherein the handoff is detected on an occurrence of a change in an IP address allocated to the multimodal device, receipt of a message from the multimodal mobile device, receipt of a DHCP message, or any other mechanism from the network or device to initiate a layer 3 handoff or change-off.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

A system for network access security policy management for a multimodal device in a converged fixed/mobile network according to the preferred embodiment is now described with reference to FIG. 4. This policy management mechanism allows for dynamic moving from one access technology to another, making the appropriate changes in security policy appropriate to each access technology used by the device, while allowing the user to remain under the same identity.

Supporting dynamic changes in the user's access device requires dynamic application of policies of various security mechanisms (for example filtering rules, access control, intrusion detection criteria, traffic management) in the access network which takes into account the characteristics of the particular access technology being used by the access devices. Such access technologies include, for example, UTRAN, WLAN, WiMax, DSL, Ethernet, 1x-EV-DO, and CDMA2000. These characteristics may include performance capabilities, expected behavior of associated protocols, change-offs, re-establishment of a connection after a successful change-off, and the specific vulnerabilities inherent to that particular type of access technology. Dynamic security policy is also needed when the device switches between different access technologies which have very different capabilities for example, when a device switches between using UMTS to WLAN to access the network. For example, a mobile device using its UMTS interface would have applied to it security policies that are relevant to UMTS network and applicable to the particular subscriber using it. If the subscriber were to relocate to a building that offers WLAN, then the WLAN interface of the mobile device would attach itself to a WLAN-AP. The converged network ideally, after the mobile device changed its access technology, changes the security policy being applied to one which is relevant to a WLAN. In the preferred embodiment, this is achieved by monitoring the access technologies being used by the multimodal mobile devices, and by modifying the security controls at various network elements upon detecting a change in the access technology being used by the multimodal device to provide the right security mechanisms to secure connection over that access technology.

Figure 1A:
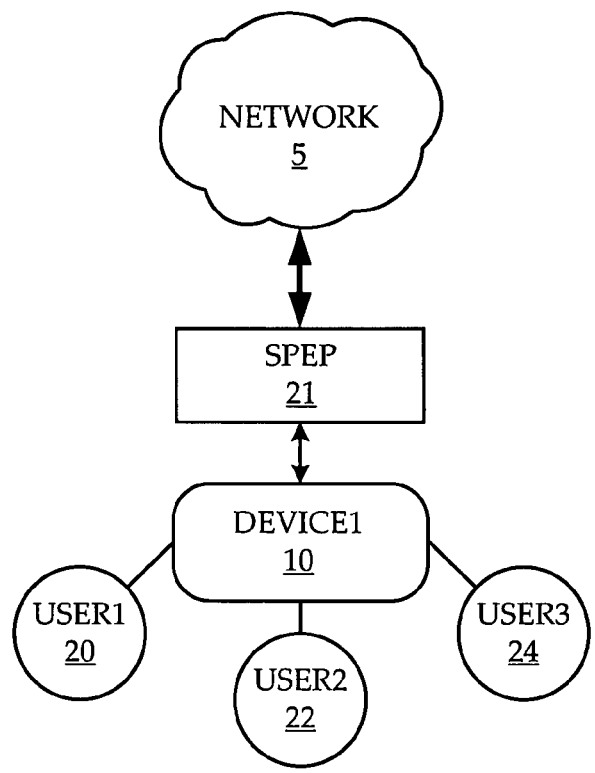
FIG. 1A is a block diagram illustrating an example of known network access through a single device by any one of a multitude of users.
Figure 1B:
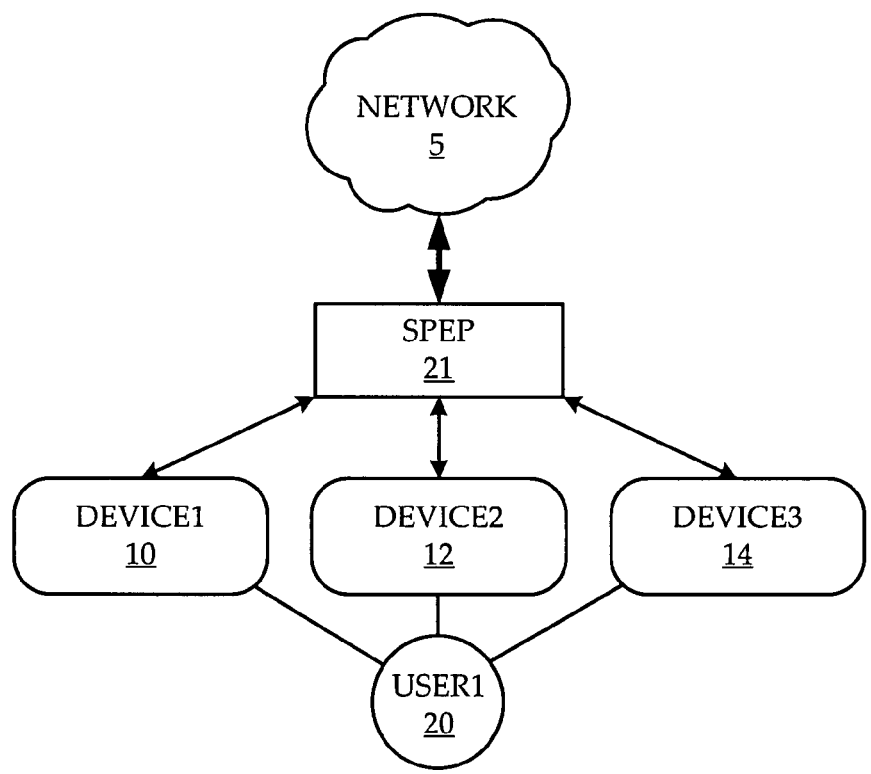
FIG. 1B is a block diagram illustrating an example of known network access by a single user through any one of a multitude of devices.
Figure 2B:
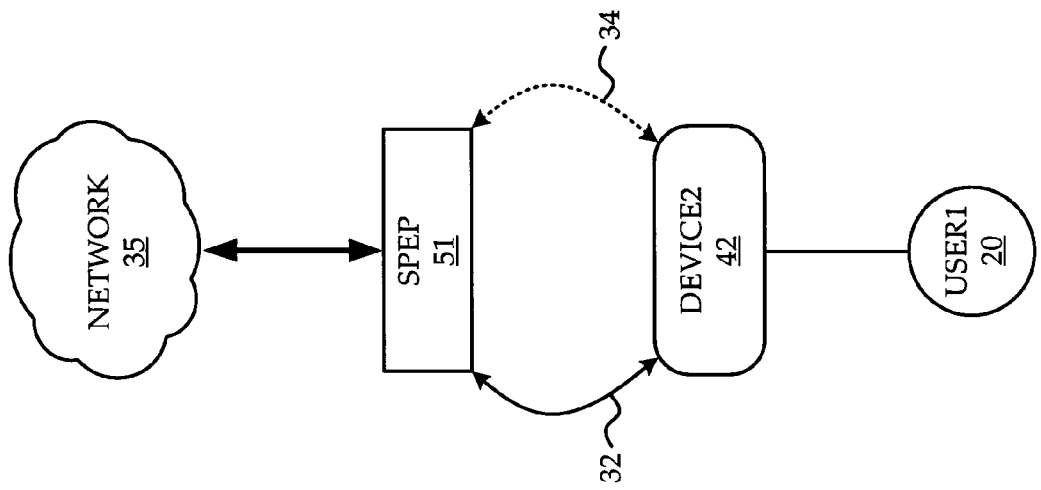
FIG. 2B is a block diagram illustrating an example of known network access by a single user through a single multimodal device.
Figure 2A:
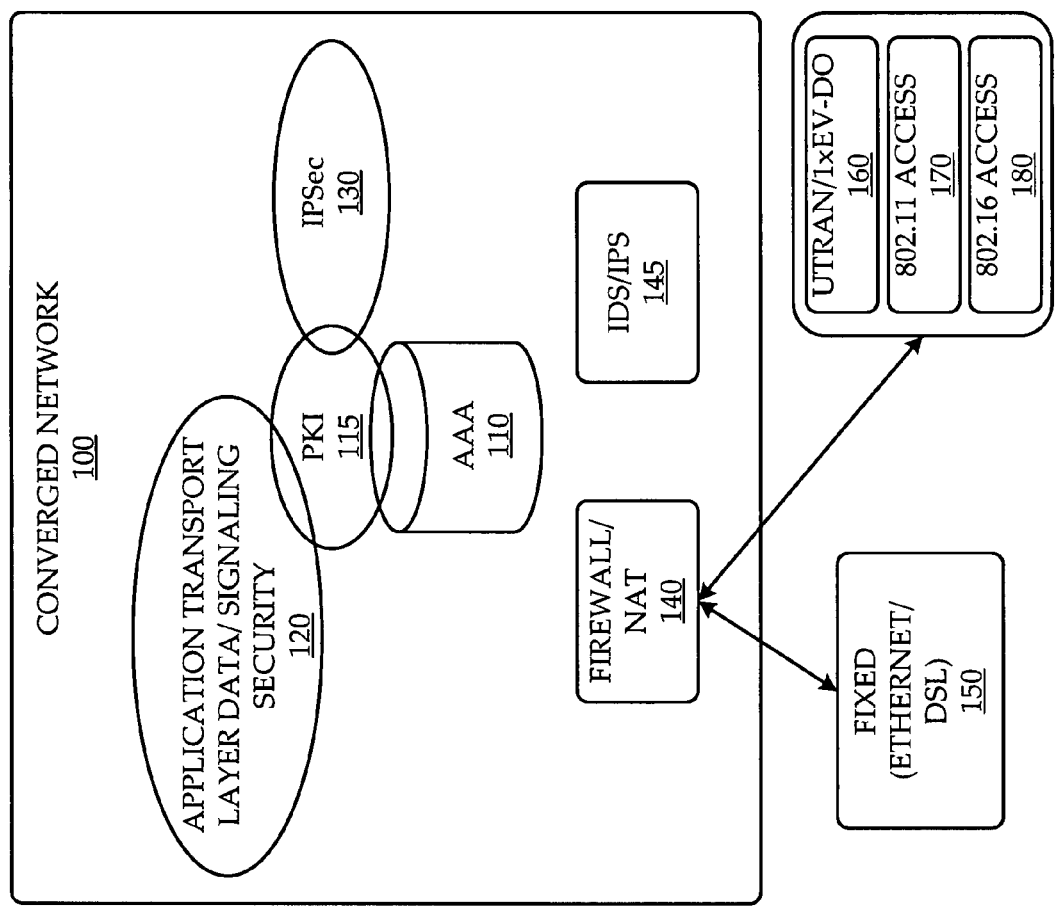
FIG. 2A is a block diagram illustrating security elements of a known converged fixed/mobile network.
Figure 3:
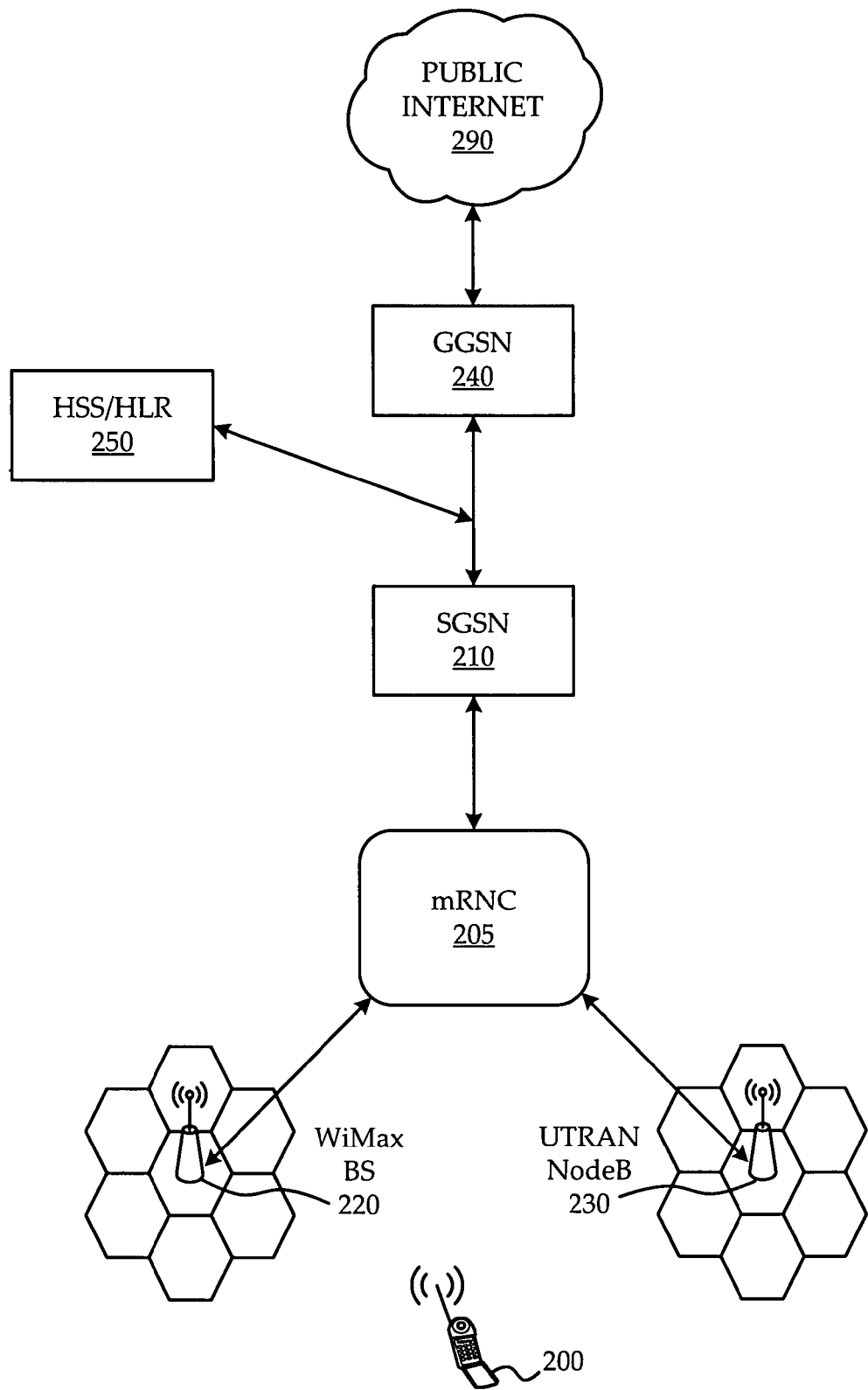
FIG. 3 is a block diagram illustrating single multimodal device access to a GGSN through WiMax or UTRAN.
Figure 4:
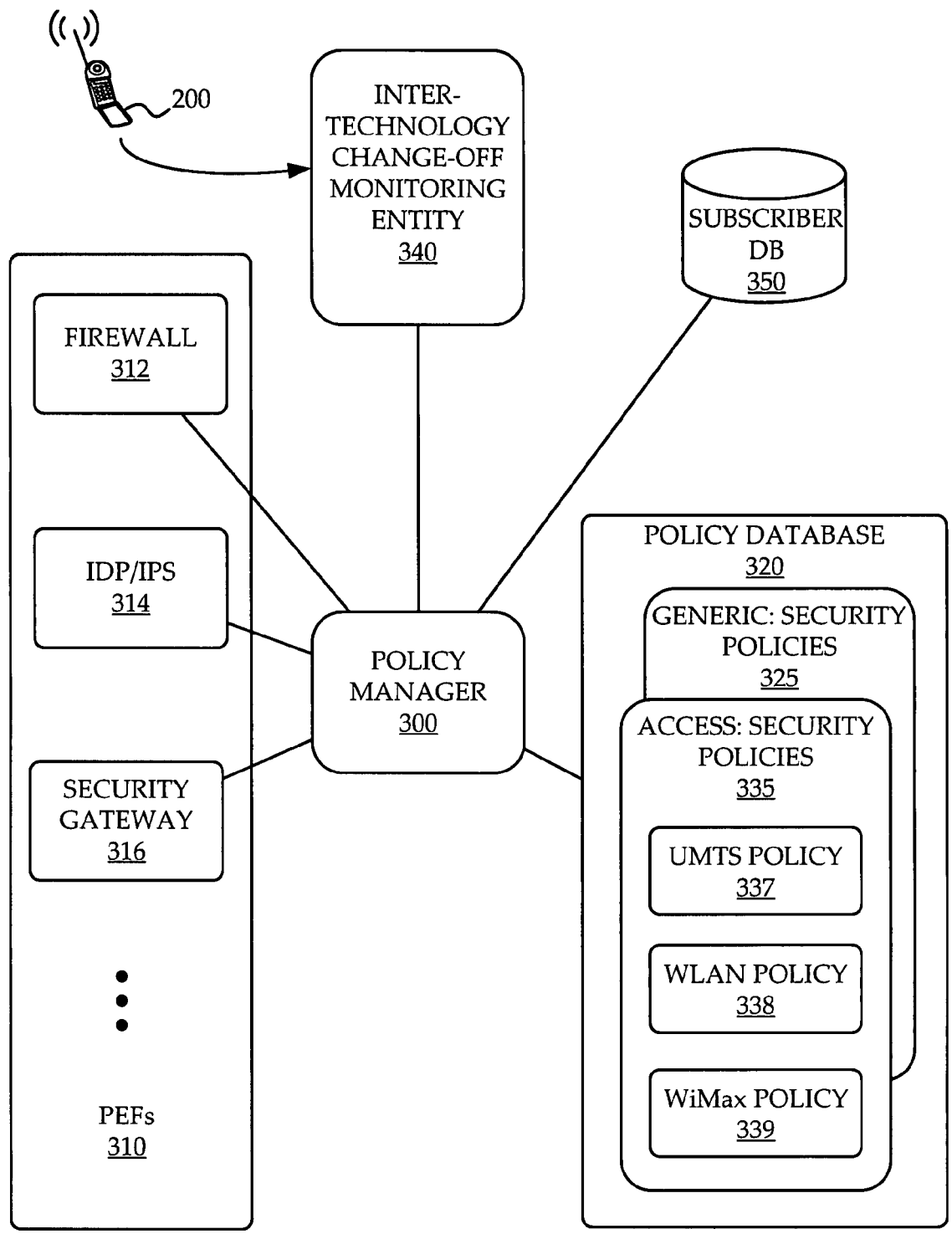
FIG. 4 is a block diagram illustrating a system for providing access security management for a multimodal device according to a preferred embodiment of the invention.

The system for network access security policy management for a multimodal device in a converged fixed/mobile network as shown in FIG. 4 will now be described in terms of its structure. Although not shown in FIG. 4, it is assumed that a user has already accessed through a multimodal mobile device 200 the converged network (not shown) and has registered as a user with the converged network. As such any user defined security policies will already be in place for the user. These may be obtained from the generic security policies 325 in the policy database 320. A primary element of the system is an inter-technology change-off monitoring entity (ICME) 340. The ICME 340 monitors the type of access being used. Any change in status caused by an inter-technology change-off is relayed to the ICME. The type of monitoring being used can be a layer 2 monitoring or higher. The ICME 340 is coupled to a policy manager 300. The policy manager 300 is coupled to a subscriber database 350 as well as a policy database 320. The policy database 320 comprises generic security policies 325 as well as access technology security policies 335. The access technology security policies 335 include individual policies corresponding to specific access technologies. In FIG. 4, the access technology security policies 335 include a UMTS policy 337, a WLAN policy 338, and a WiMax policy 339. Although not shown in the figure, the access technology security policies 335 could also include other access technology policies such as DSL or Ethernet policies and others. The policy manager 300 is also coupled to various policy enforcement points (PEFs) 310 including a firewall 312, an IDS/IPS 314, and a security gateway 316.

The system for network access security policy management for a multimodal device in a converged fixed/mobile network as shown in FIG. 4 will now be described in terms of its function. Once the multimodal mobile device 200 starts to change the access technology it is using to access the converged fixed/mobile network, the ICME 340 monitors that the change in access technology is taking place. Monitoring can occur at either a layer 2 level or a higher layer level. If monitoring occurs at layer 2, then for example WLAN layer 2 messages may be monitored for an association which can be used to indicate the inter-technology change-off from UMTS to WLAN. Similarly UMTS-layer 2 messages sent by the multimodal mobile device to, for example, an SGSN/GGSN can indicate an inter-technology change-off to a UMTS network. If monitoring occurs at layer 3, for example, an allocation of IP addresses belonging to a particular group/subnet could indicate inter-technology change-off. In other words, monitoring the IP address allocated to the device can provide an indication of change in status (status implying an occurrence of inter-technology change-off). If DHCP assigns IP addresses belonging to different subnets/groups to different technologies then a DHCP message indicating a request for or obtaining an IP address can be used as an indication. This entity can also use Mobile. IP registration messages sent by the multimodal mobile device to the home agent to indicate a change in technology. There are also various other means for detecting an inter-technology change-off.

Once the ICME 340 determines an inter-technology change-off has commenced, it notifies the policy manager 300 with a notification including a user ID identifying the user, a universal device ID identifying the device, and a technology change identifier identifying the technology to which the mobile is changing and in an exemplary embodiment identifying also the technology from which the mobile is changing. In alternative embodiments other operational information is included in the notification including for example the bandwidth of the Network Interface Card of the mobile device, the latency of the connection or the jitter of the connection. Using this information, a policy manager 300 looks up the subscriber database 350 to obtain the subscriber's credentials, subscription class and other parameters including a subscriber policy ID. Using the subscriber details, the policy manager 300 fetches from the policy database 320 the policy files pertaining to the subscriber, as well as policies based on the access technology being used. The generic security policies 325 comprise the security policies pertaining to the subscriber, while the access technology security policies 335 comprise the security policies pertaining to each access technology. In a change-off from UMTS to WLAN for example, the policy manager 300 would retrieve from the access technology security policies 335 the WLAN policy 338. The policy manager 300 would then determine the appropriate policies that must be applied to the various policy enforcement points (PEFs) 310. This determination in general involves an addition of all of the generic security policies and access technology security policies which apply to the subscriber and the subscriber's multimodal mobile device while using its particular access technology. Portions of the security policy for which the PEFs are responsible for enforcing are then conveyed in messages to the appropriate PEFs 310 which enforce the security appropriate to the subscriber and the access technology being used. Messages may be conveyed to the PEFs 310, for example, using the MIDCOM protocol or using the Universal Plug'n Play protocol. Typically the PEFs 310 only implement the policies after they have authenticated the message sent by the policy manager 300. The messages may be authenticated, for example, by having a Message Authentication Code computed on the packet by agreed-upon algorithms and keys or using some form of PKI. The messages may also be transported over secure channels such as IPSec.

Enforcement of the security appropriate to the subscriber and the access technology often require adjustment of the security controls for that session involving the particular subscriber and access technology. These adjustments to the enforced security policy are determined by the controls or access technology security rules retrieved from the policy database 320 and could include limiting the incoming traffic by rate or by type, looking for attack signatures, setting alarm thresholds, and other controls specific to the access technology. Once security settings are in place at the PEFs 310, it is imposed on traffic traversing between the multimodal mobile device 200 and the converged network.

In some embodiments the security policy does not include any detailed user dependent security policy but instead utilizes the policy manager 300 to modify a generic or common set of security policies to take into account the access technology dependent security policy considerations based on the access technology being used. This typically would still be associated with general authentication of the user.

Figure 5:
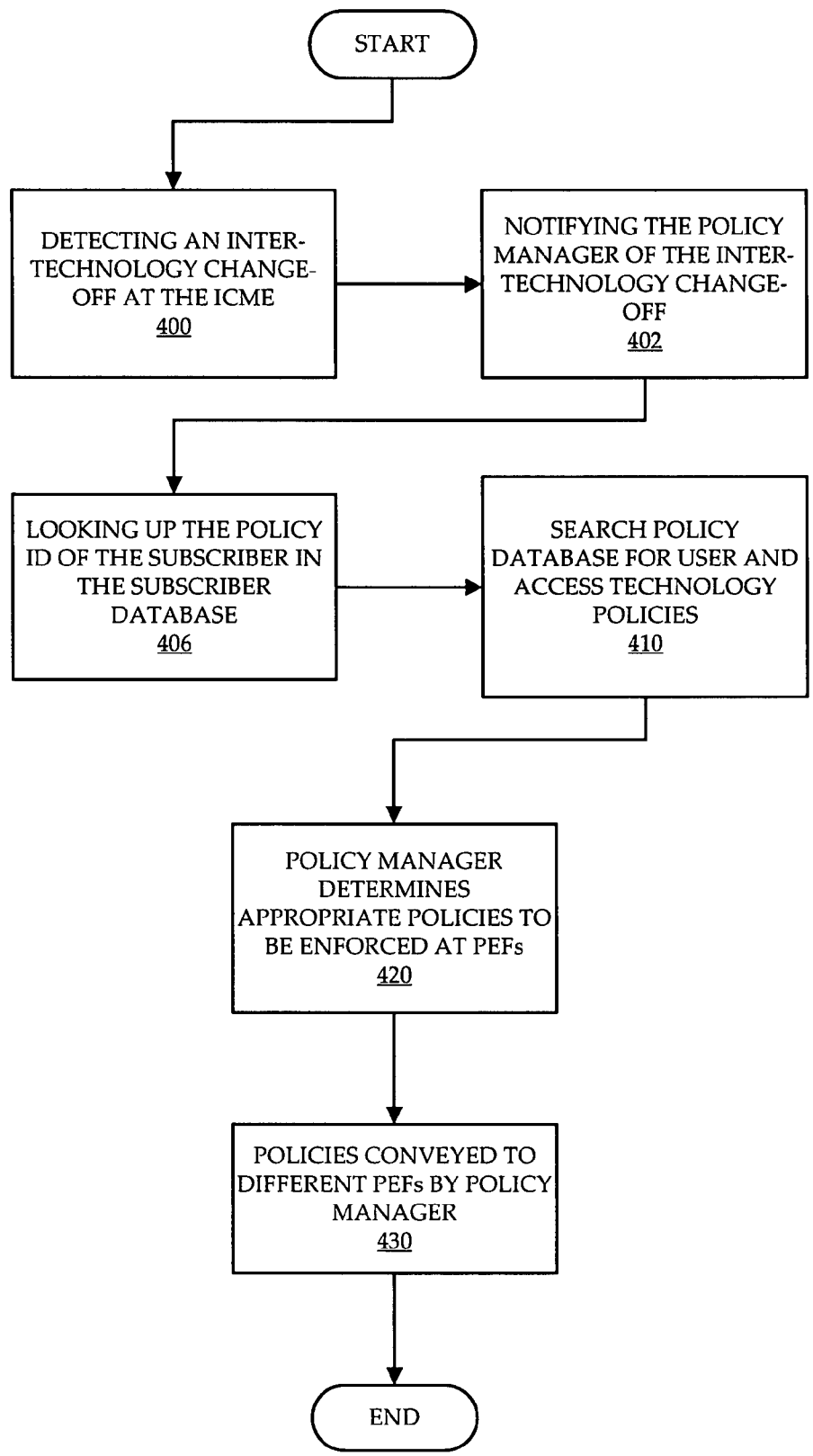
FIG. 5 is a block diagram illustrating method steps for providing access security management for a multimodal device according to a preferred embodiment of the invention.

A method for network access security policy management for a multimodal device according to the preferred embodiment is now described with reference to FIG. 5. At step 400, an inter-technology change-off is detected at the ICME. At step 402, the ICME notifies the policy manager of the inter-technology change-off. At step 406, the policy manager looks up the subscriber's policy ID in the subscriber database. At step 410, the policy manager searches the policy database for the user and access technology policies. At step 420, the policy manager determines the appropriate policies to be enforced at the various policy enforcement points (PEFs). At step 430, the policy manager finally conveys the various security policies to the respective PEFs for enforcement.

Before putting the respective security policies in place, the PEFs first authenticate the respective messages received from the policy manager. Once the PEFs have their respective security policies in place, they can perform their function to enforce security which takes into account both the user policy and the policies associated with the access technology.

In an exemplary embodiment, steps 400, 402, 406, 410, and 420 are performed during an inter-technology change-off while step 430 is only performed after the inter-technology change-off has successfully completed. In another exemplary embodiment, step 430 is performed after a layer 2 change-off has successfully completed but before the completion of a layer 3 change-off.

The embodiments presented are exemplary only and persons skilled in the art would appreciate that variations to the embodiments described above may be made without departing from the spirit of the invention. The scope of the invention is solely defined by the appended claims.

We claim:

1. A system for network access security policy management of multimodal access to a converged network, the system comprising:
an inter-technology change-off monitoring entity (ICME) for detecting an inter-technology change-off of a multimodal device from a first access technology of the converged network to a second access technology of the converged network, and for transmitting an inter-technology change-off message;
a policy database for storing a plurality of access technology policies; and
a policy manager for receiving said inter-technology change-off message from the ICME, for searching said policy database for an access technology policy corresponding to said second access technology, for determining appropriate policies to be enforced, and for distributing said appropriate policies to at least one policy enforcement point (PEF) for enforcing said appropriate policies in respect of access by the multimodal device to the converged network,
wherein at least one of the ICME and the policy manager is implemented in hardware.

2. A system according to claim 1 wherein said inter-technology change-off message comprises a user ID identifying a subscriber, and at least one of a device ID, a second access technology indicator, and a first access technology indicator.

3. A system according to claim 2 wherein said policy manager is further for looking up, in a subscriber database, subscriber security parameters of a subscriber identified in the inter-technology change-off message, and for searching said policy database for a user policy corresponding to said subscriber.

4. A system according to claim 1 wherein said policy manager distributes said appropriate policies after a layer 2 portion of said inter-technology change-off has completed and before a layer 3 portion of said inter-technology change-off has completed.

5. A system according to claim 1 wherein the ICME is one of a layer 2 monitoring entity and a higher than layer 2 monitoring entity.

6. A system according to claim 5 wherein the ICME is a layer 2 monitoring entity and wherein the inter-technology change-off is between UMTS and WLAN and wherein a change-off is detected when an association occurs.

7. A system according to claim 5 wherein the ICME is a layer 3 monitoring entity and wherein the inter-technology change-off is between UMTS and WLAN and wherein the change-off is detected on an occurrence of a change in an IP address allocated to the multimodal device, receipt of a message from the multimodal mobile device, receipt of a DHCP message, or any other mechanism from the network or device to initiate a layer 3 handoff or change-off.

8. A system according to claim 1 wherein said appropriate policy is a combination of said user policy and said access technology policy, and wherein portions of said appropriate policy are distributed to each PEF of said at least one PEF.

9. A system according to claim 8 wherein said combination of said user policy and said access technology policy is a sum of said user policy plus said access technology policy.

10. A method for network access security policy management of multimodal access to a converged network, the method comprising:
detecting at an inter-technology change-off monitoring entity (ICME) occurrence of an inter-technology change-off of a multimodal device from a first access technology of the converged network to a second access technology of the converged network;
transmitting an inter-technology change-off message from said inter-technology change-off monitoring entity (ICME) to a policy manager;
searching a policy database by said policy manager for an access technology policy corresponding to said second access technology;
determining at the policy manager appropriate security policies to be enforced;
distributing from said policy manager to at least one policy enforcement point (PEF) said appropriate security policies; and
enforcing said appropriate security policies at said at least one PEF in respect of access by the multimodal device to the converged network.

11. A method according to claim 10 wherein said inter-technology change-off message comprises a user ID identifying a subscriber, and at least one of a device ID, a second access technology indicator, and a first access technology indicator.

12. A method according to claim 11 further comprising:

looking up, in a subscriber database, by the policy manager, subscriber security parameters of a subscriber identified in the inter-technology change-off message; and searching said policy database, by said policy manager, for a user policy corresponding to said subscriber.

13. A method according to claim 10 wherein said step of distributing said appropriate policies is performed after a layer 2 portion of said inter-technology change-off has completed and before a layer 3 portion of said inter-technology change-off has completed.

14. A method according to claim 10 wherein the step of detecting occurrence of an inter-technology change-off occurs at one of a layer 2 monitoring level and a higher than layer 2 monitoring level.

15. A method according to claim 14 wherein detecting occurrence of an inter-technology change-off occurs at a layer 2 monitoring level, wherein the inter-technology change-off is between UMTS and WLAN, and wherein the inter-technology change-off is detected when an association occurs.

16. A method according to claim 14 wherein detecting occurrence of an inter-technology change-off occurs at a layer 3 monitoring level, wherein the inter-technology change-off is between UMTS and WLAN, and wherein the change-off is detected on an occurrence of a change in an IP address allocated to the multimodal device, receipt of a message from the multimodal mobile device, receipt of a DHCP message, or any other mechanism from the network or device to initiate a layer 3 handoff or change-off.

17. A method according to claim 10 wherein said appropriate policy is a combination of said user policy and said access technology policy, and wherein portions of said appropriate policies are distributed to each PEF of said at least one PEF.

18. A method according to claim 17 wherein said combination of said user policy and said access technology policy is a sum of said user policy plus said access technology policy.

* * * * *